Figure 1:
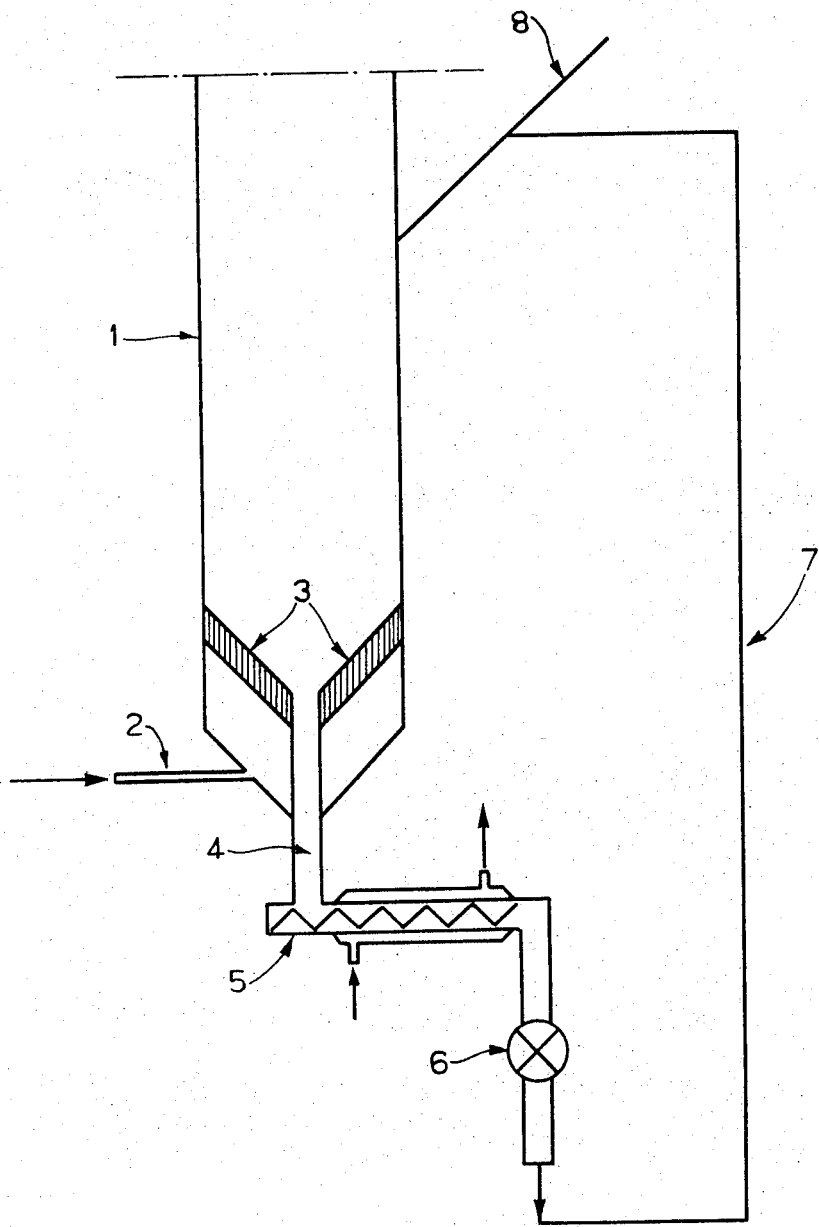

United States Patent
Piccolo et al.

[11] 3,758,675
[45] Sept. 11, 1973

[54] PROCESS FOR PREPARING ALUMINUM TRICHLORIDE

[75] Inventors: Luigi Piccolo; Benedetto Calcagno, both of Milan, Italy

[73] Assignee: Societa Italiana Resine S.p.A., Milan, Italy

[22] Filed: Dec. 22, 1971

[21] Appl. No.: 210,722

[30] Foreign Application Priority Data
Dec. 23, 1970  Italy.............................. 33463 A/70

[52] U.S. Cl................. 423/495, 423/136, 423/659
[51] Int. Cl. ............................................. C01f 7/58
[58] Field of Search..................... 423/495, 136, 659

[56] References Cited
UNITED STATES PATENTS
3,222,127  12/1965  Wilson................................ 423/495
3,446,579  5/1969  Toomey et al..................... 423/495

OTHER PUBLICATIONS
Book "Fluidization" by Donald F. Othmer, 1956 Ed., pages 119, 173 and 186. Reinhold Publishing Corp., New York.

*Primary Examiner*—Edward Stern
*Attorney*—Richard C. Sughrue, J. Frank Osha et al.

[57] ABSTRACT

A continuous process for producing aluminum trichloride by reacting in a fluid-bed reactor, at 310°–580°C, a chlorine-containing gas with a fluidised bed of aluminum particles, which comprises feeding the chlorine-containing gas at the bottom of the fluidised bed of aluminum particles, through a gas distributor whose upper surface is inclined with respect to the vertical and discharging continuously said fluidised bed of aluminum particles through an outlet means which is located at the lowermost part of said inclined upper surface. The dischared particles are then cooled and recycled to the top end of the fluidised bed with fresh aluminum particles. At the top of the fluid-bed reactor, an aluminum trichloride containing gaseous stream is discharged and aluminum trichloride is separated therefrom.

12 Claims, 2 Drawing Figures

PROCESS FOR PREPARING ALUMINUM TRICHLORIDE

The present invention relates to an improved process for the manufacture of aluminum trichloride, more particularly it relates to the production of anhydrous aluminum trichloride by reacting chlorine on solid aluminum, using the fluidised bed technique.

Aluminum trichloride is a product which is very useful in industry, particularly as a catalyst in Friedel-Crafts reactions, and it can be prepared by the reaction of chlorine on a mixture of bauxite and carbon. The carbon acts as a reducing agent on the bauxite and the oxygen, supplied together with the chlorine, combines with the excess carbon to provide the heat necessary for the reaction.

By means of such a process, fairly impure aluminum trichloride is obtained with a titre equal to approximately 95 percent.

A higher purity product may be obtained according to another process known in the art, whereby gaseous chlorine is supplied over molten aluminum, and the aluminum trichloride which sublimes at the temperature conditions in which chlorination occurs, is condensed.

More precisely, the aluminum trichloride is collected in appropriate condensers where it accumulates in the form of crystals which are periodically removed, then sieved and lastly placed in steel containers.

This process requires rather complex equipment and has drawbacks in connection with the use of extremely corrosive products, due to the elevated temperatures required in chlorination of the molten aluminum.

In addition, aluminum trichloride is produced in the form of granules which are not readily usable as a catalyst in Friedel-Craft reactions.

In order to avoid these drawbacks, industry has resorted to the chlorination, using gaseous chlorine, of solid aluminum in the form of fluidised particles.

In this way, compared to the bauxite processes, aluminum trichloride is obtained in a far purer state and in addition, the following advantages over the methods using molten aluminum are obtained:

the working temperatures are considerably lower so that there is consequently less attack on the materials of the reactor; there is an absence of slag and lesser grade products of chlorination caused by the aluminum attacking the aluminum trichloride;

desublimation is increased in regularity, with the formation of aluminum trichloride which is more suitable as a catalyst in that it consists of fine and homogenous powder;

the equipment is substantially simplified.

However, attempts so far made to achieve a fluidised bed of aluminum particles have not proved successful, mainly due to the localised superheating which occurs in the reaction of chlorine with granular aluminum.

Under these conditions, in fact, the aluminum undergoes an aggregating and incipient fusion process by which the various granules become bonded to one another, forming agglomerates of, sometimes, substantial size.

The fluidisation system is thus compromised and continuous operation is rendered impossible.

It has now been found that these drawbacks can be eliminated or mitigated by the process according to the present invention, which consists essentially in supplying gaseous chlorine diluted by inert gas to the bottom of a fluidised bed of aluminum particles and in continuously removing that part of the fluidised bed which is in immediate contact with the gas stream being supplied.

More precisely, the process of the present invention for producing aluminum trichloride by reacting in a fluid-bed reactor, at elevated temperatures, a chlorine-containing gas with a fluidised bed of aluminum particles, comprises feeding the chlorine-containing gas at the bottom of the fluidised bed of aluminum particles, through a gas distributor whose upper surface is inclined with respect to the vertical; discharging continuously the fluidised bed of aluminum particles through an outlet means which is located at the lowermost part of said inclined upper surface; cooling the discharged particles and recycling the cooled particles to the top end of the fluidised bed with fresh aluminum particles; discharging an aluminum trichloride containing gaseous stream at the top of the fluid-bed reactor; and separating the aluminum trichloride from the gaseous stream.

By virtue of this arrangement and using a mixture of inert gas and chlorine for fluidisation, it is possible to carry out the reaction of chlorination of the aluminum without any difficulty, in that the phenomena of agglomeration of particles are avoided and in addition optimum control of the exothermicity of the reaction is achieved.

FIG. 1 diagrammatically shows a form of apparatus suitable for the method according to the present invention.

Figure 2:
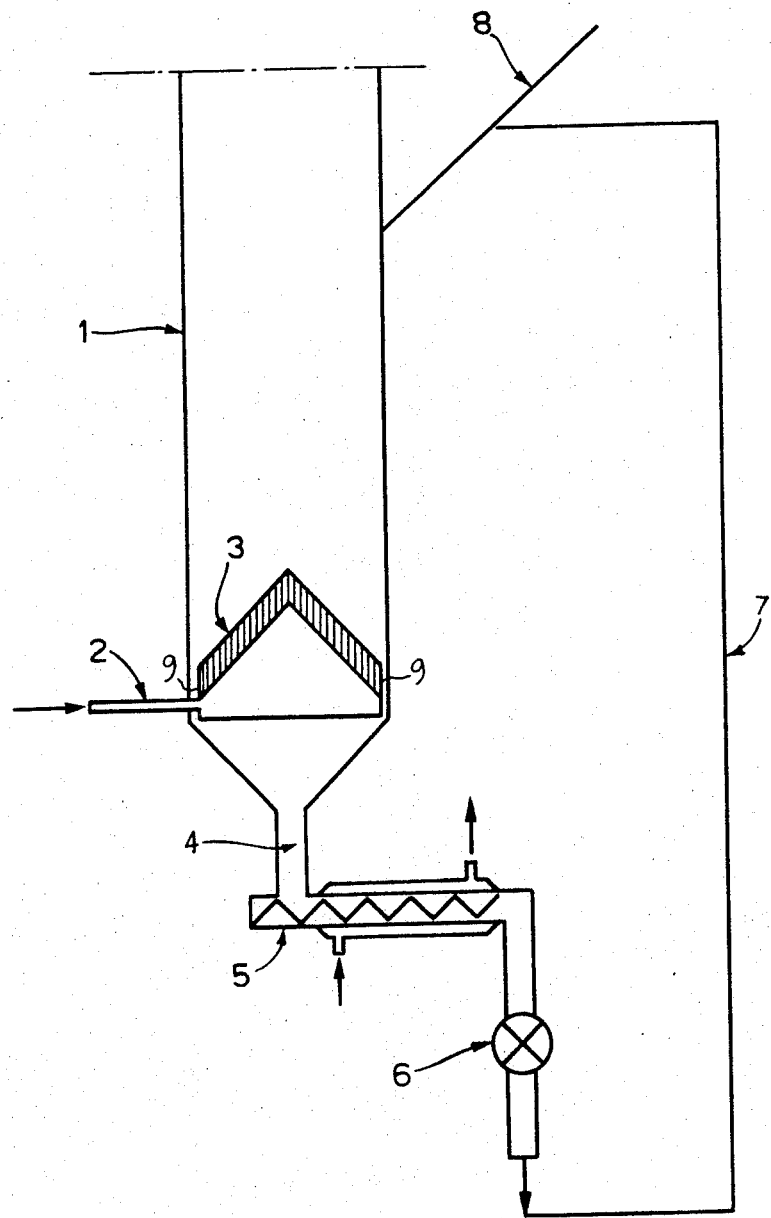

FIG. 2 diagrammatically shows another form of apparatus suitable for the process according to the present invention.

Referring to FIG. 1, an elongated vertical reactor 1 in which the aluminum particles are maintained in fluidised form, made from corrosion-resistant materials, such as for example quartz, is fitted with a heating system (not shown in the drawings) to raise the temperature to the levels desired for the progress of chlorination.

Through a line 2, a mixture of chlorine gas and inert gas is supplied to the bottom of the reactor 1, being distributed by means of a gas-distributor 3 at the bottom of the bed of fluidised particles.

Gas distributor 3 is preferably made from silico-aluminous material of high porosity and is in particular a concave-upward, conical funnel-shaped distributor. This distributor promotes continuous removal of the particles constituting the fluidised bed which are in immediate contact with the supply of gas.

It has been found that the best conditions are achieved by feeding the chlorine-containing gas through a conical, funnel-shaped gas-distributor in which the angle formed by its central axis and a generatrix is approximately 45°.

The aluminum particles are withdrawn from the fluid bed through a tube 4 located centrally with respect to the reactor, in the lowermost part of gas distributor 3, and passed to a screw system 5.

The tube 4 is preferably constructed of alloy with a high nickel content, while the screw 5 has a shell through which water circulates to cool the material. The cooled material is then discharged by means of a star valve 6 to an elevator (not shown) and passes through a pipe 7 to the chlorination reactor. Fresh aluminum is supplied to the top end of reactor 1, through a pipe 8.

Referring to FIG. 2, the gas distributor 3 is a concave-downward conical, funnel-shaped distributor in which the angle formed by its central axis and a generatrix is approximately 45°. This arrangement encourages continual removal of that part of the fluidised bed which is in immediate contact with the stream of gas being supplied. The aluminum particles are discharged through an annular space 9 which is defined between the reactor inner wall and the distributor, this annular space being located in the lowermost part of gas-distributor 3.

The other numerals used in FIG. 2 have the same significance as those in FIG. 1.

In the achievement of the objects of the present invention, the chlorination reactor is supplied with chlorine diluted with inert gas such as for example nitrogen, argon and helium.

It has been found that the best conditions are achieved by gaseous mixtures having a chlorine content of 40 to 60 percent by volume. These gaseous mixtures are fed to the chlorination reactor and distributed at the foot of the bed of aluminum particles under conditions designed to maintain the particles temselves in fluidised form.

The chlorination reaction is carried out at temperatures ranging from 310° to 580°C and preferably 350° to 450°C, fresh aluminum granules being supplied to the reactor in a particle size of for example 0.05 to 1.5 mm and preferably 0.1 to 0.6 mm.

Further, as stated above, that part of the fluidised bed which is in immediate contact with the stream of gas being supplied is continually removed.

For this purpose, the particles of aluminum at the bottom of the fluidised bed are continually removed according to the rate of extraction of the specific output of the reactor, the thoughput of inert gas, the heat dispersed in the reactor and the presence of any heat exchange media during the chlorination reactor.

It has been found that, by working according to the process of the present invention, the best results are obtained by withdrawing the particles from the bottom of the fluidised bed in such a way as to achieve a complete replacement of the bed itself 3 to 15 times every hour and preferably 6 to 9 times every hour.

By cooling the particles withdrawn from the fluidised bed to a temperature approximately equal to ambient temperature and recycling them in the reaction medium, together with fresh aluminum, it is possible finally to control the exothermicity of the reaction.

By working under these conditions, aluminum trichloride is prepared in pure form, effectively obviating the drawbacks which derive from agglomeration of the aluminum particles in the fluidised bed.

Furthermore, the chlorine is completely utilised and aluminum trichloride is produced in the form of a fine powder.

More particularly, the products of reaction which consists essentially of aluminum trichloride and inert gas are discharged at the head of the chlorination reactor and are passed into a powder chamber which is kept at a higher temperature of approximately 200°C, in which any unreacted aluminum powder entrained by the gases becomes deposited.

The gaseous mixture is then passed into a vertical stainless steel column which is externally cooled, for example by being sprinkled with water.

In this column, the aluminum trichloride undergoes desublimation and is collected at the bottom, while the residual inert gas is recycled to the chlorination stage.

Example 1

An apparatus of the type shown diagrammatically in FIG. 1 is used.

More particularly, the reactor consists of a quartz tube with an inside diameter of 140 mm, provided at the bottom with a distributor for the chlorine and made from silico-aluminous material of high porosity, set in the form of a funnel with an angle of 45° with respect to the central axis through the reactor, as shown in the appended FIG. 1.

The reactor is also provided with a tube located centrally with respect to the reactor, the top end of the tube being positioned at a height equal to that of the distributor plate and communicating at the bottom with a screw system cooled by the circulation of water. Aluminum granules with a particle size of 0.1 to 0.6 mm are deposited in the reactor to a height of 500 mm. The charge is then heated by resistance to a temperature of 375°C and at this point the supply of gaseous mixture commences, the external heating being discontinued. More particularly, chlorine at the rate of 3.36N.cu.m/hr and nitrogen at the rate of 3.36 N.cu.m/hr. are supplied through the porous plate at the bottom of the reactor, while fresh aluminum of the aforesaid granulometry is supplied at the rate of 2.7 kg/hr. at the top of the reactor.

At the same time, aluminum is discharged from the bottom of the reactor, cooled and resupplied to the fluidised bed together with fresh aluminum, the height of the fluidised bed being maintained constant. The quantity of aluminum powder which is discharged and recycled is equal to 40.5 kg/hr.

In these operating conditions there are achieved a temperature of around 405°C in the fluidised bed and a complete transformation of the chlorine into aluminum trichloride. This latter is finally recovered in the form of powder in the manner previously described.

After 20 hours of operation, the test was discontinued in order to check the granulometry of the aluminum in the chlorination reactor; no agglomeration was found.

Example 2

The same procedure was adopted as in Example 1, except that the funnel-shaped gas distributor was replaced by a flat, horizontal perforated plate. After a few hours of running, a deterioration of the fluidisation conditions occurred, caused by sintering of aluminum particles.

Example 3

The same procedure was adopted as in Example 1, chlorine being supplied at 3.02 N.cu.m/hr, nitrogen at 3.7 N.cu.m/hr. and in granules at 2.43 kg/hr. The rate of recycling of was in addition raised to 36.5 kg/hr. The results obtained were similar to those in Example 1.

Example 4

The same procedure was adopted as in Example 1, chlorine being supplied at 3.7 N.cu.m/hr, nitrogen at 3.02 N.cu.m/hr. and aluminum at 2.97 kg/hr. The speed of recycling of aluminum was in addition raised to 45.5 kg/hr. The results obtained were similar to those in Example 1.

Example 5

The same procedure was adopted as in Example 1, without nitrogen being supplied.

After 2 hours' running, the reaction was discontinued due to deterioration of the fluidisation due to the formation of agglomerates among the aluminum particles.

What we claim is:

1. In a continuous process for producing aluminum trichloride comprising:
   1. continuously feeding a gas containing gaseous chlorine and an inert gas to a fluidized bed reactor containing a fluidized bed of aluminum particles;
   2. continuously reacting said gas with said aluminum particles at an elevated temperature of from 310° to 580° C.;
   3. continuously discharging an aluminum trichloride-containing gaseous stream from said reactor and
   4. continuously separating the product aluminum trichloride from said aluminum trichloride-containing gaseous stream, the improvement comprising:
   continuously feeding said gas to the bottom of said fluidized bed of aluminum particles through a concave-downward conical funnel-shaped gas distributor;
   continuously discharging, from said reactor, said fluidized bed of aluminum particles through an outlet means located at the lowermost part of said gas distributor;
   cooling the discharged aluminum particles;
   mixing the cooled aluminum particles with fresh aluminum particles; and
   recycling the mixture to the top of said fluidized bed of aluminum particles, whereby agglomeration of said aluminum particles in the reactor is avoided.

2. The process as claimed in claim 1, wherein the reaction temperature ranges between about 350° and 450°C.

3. The process of claim 1, wherein said aluminum particles are discharged from said reactor through an annular space defined between the reactor inner wall and the gas distributor.

4. The process of claim 3, wherein the angle formed by the central axis of the gas distributor and a generatrix is approximately 45°.

5. The process of claim 1, wherein the aluminum particles are discharged from the fluidized bed at such a rate as to ensure complete replacement of the bed three to fifteen times every hour.

6. The process of claim 5, wherein the rate of replacement of the bed is 6 to 9 times an hour.

7. The process of 1, wherein the chlorine-containing gas is a mixture of chlorine with an inert gas.

8. The process of claim 1, wherein said inert gas is nitrogen, argon or helium and wherein the amount of chlorine in the gas fed to the reactor ranges between 40 and 60 percent by volume.

9. The process of claim 1, wherein the aluminium particles range in size from 0.05 to 1.5 mm.

10. The process of claim 4, wherein the aluminium particles range in size from 0.01 to 0.6 mm.

11. The process of claim 1 wherein the discharged aluminum particles are cooled to about room temperature.

12. The process of claim 1 further comprising separating from said aluminum trichloride-containing gaseous stream any unreacted aluminum particles before separating therefrom said product aluminum trichloride.

* * * * *